US012187254B2

(12) United States Patent
Hayes

(10) Patent No.: US 12,187,254 B2
(45) Date of Patent: Jan. 7, 2025

(54) DUAL DIFFERENTIAL POTENTIOMETER SENSING FOR TRAILER CONTROL

(71) Applicant: Bendix Commercial Vehicle Systems LLC, Avon, OH (US)

(72) Inventor: Thomas J. Hayes, Lakewood, OH (US)

(73) Assignee: Bendix Commercial Vehicle Systems, Avon, OH (US)

( * ) Notice: Subject to any disclaimer, the term of this patent is extended or adjusted under 35 U.S.C. 154(b) by 267 days.

(21) Appl. No.: 17/644,515

(22) Filed: Dec. 15, 2021

(65) Prior Publication Data

US 2023/0182695 A1 Jun. 15, 2023

(51) Int. Cl.
*B60T 7/20* (2006.01)
*B60T 13/66* (2006.01)

(52) U.S. Cl.
CPC .............. *B60T 7/20* (2013.01); *B60T 13/662* (2013.01)

(58) Field of Classification Search
CPC ........ B60T 7/20; B60T 13/662; B60T 8/1708; B60T 17/221; B60Q 9/00; B60Q 5/005
See application file for complete search history.

(56) References Cited

U.S. PATENT DOCUMENTS

| 5,709,435 | A | 1/1998 | Wood |
| 5,800,025 | A | 9/1998 | McGrath et al. |
| 6,039,410 | A | 3/2000 | Robertson et al. |
| 9,150,201 | B2 * | 10/2015 | Smith .................. B60T 8/1708 |
| 9,663,079 | B2 | 5/2017 | Yamamoto |
| 9,821,779 | B2 * | 11/2017 | Grandstaff ................ B60T 7/20 |
| 10,207,687 | B1 * | 2/2019 | Shimizu .................. B60T 7/085 |
| 2005/0035870 | A1 | 2/2005 | Bauerle et al. |
| 2006/0043963 | A1 | 3/2006 | Kaneyasu et al. |
| 2016/0031552 | A1 | 2/2016 | Zell |
| 2021/0261105 | A1 | 8/2021 | Zhou et al. |

OTHER PUBLICATIONS

International Search Report (PCT/ISA/210) issued in PCT Application No. PCT/US2022/052762 dated Mar. 21, 2023 (two (2) pages).
Written Opinion (PCT/ISA/237) issued in PCT Application No. PCT/US2022/052762 dated Mar. 21, 2023 (five (5) pages).

* cited by examiner

*Primary Examiner* — Pamela Rodriguez
(74) *Attorney, Agent, or Firm* — Crowell & Moring LLP

(57) ABSTRACT

A controller and method for controlling trailer service braking on a tractor-trailer vehicle are provided. The controller receives a signal from a trailer hand control apparatus, disposed in the cab of the tractor, that is manually activated by a driver. The signal received by the controller includes a differential signal obtained from two sensors having values that change in opposite directions based on movement of the trailer hand control apparatus. Based on the signal, the controller outputs a control signal that is output to a valve controller which controls the application of the trailer service brakes.

16 Claims, 4 Drawing Sheets

DUAL DIFFERENTIAL POTENTIOMETER SENSING FOR TRAILER CONTROL

BACKGROUND AND SUMMARY OF THE INVENTION

The present invention relates to a controller and method for controlling trailer service braking. In a tractor-trailer commercial vehicle, the driver of the vehicle actuates the foot brake pedal to apply the service brakes on both the tractor and the trailer. If the driver desires to apply only the service brakes on the trailer, they can actuate a manually operable lever in the cab of the tractor. In conventional tractor-trailers, when the driver actuates this lever, a pneumatic signal is applied through a trailer brake control valve to the service brakes of the trailer, but the service brakes of the tractor remain released. Application of the trailer service brakes alone is not intended to replace a full vehicle service brake application that occurs when the driver uses the foot brake pedal.

In contrast to conventional tractor-trailer vehicle systems, which use a pneumatic signal generated by movement of the manual trailer brake control lever, the present invention obtains an electrical signal generated by movement of the manual trailer brake control lever to control trailer braking. Accordingly, the present invention reduces the cost and complexity of the trailer service braking system because pneumatic lines are not needed in the cab of the vehicle for trailer service braking. Additionally, as described below, the system according to the present invention provides for reduced noise and improved safety in the trailer service braking system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
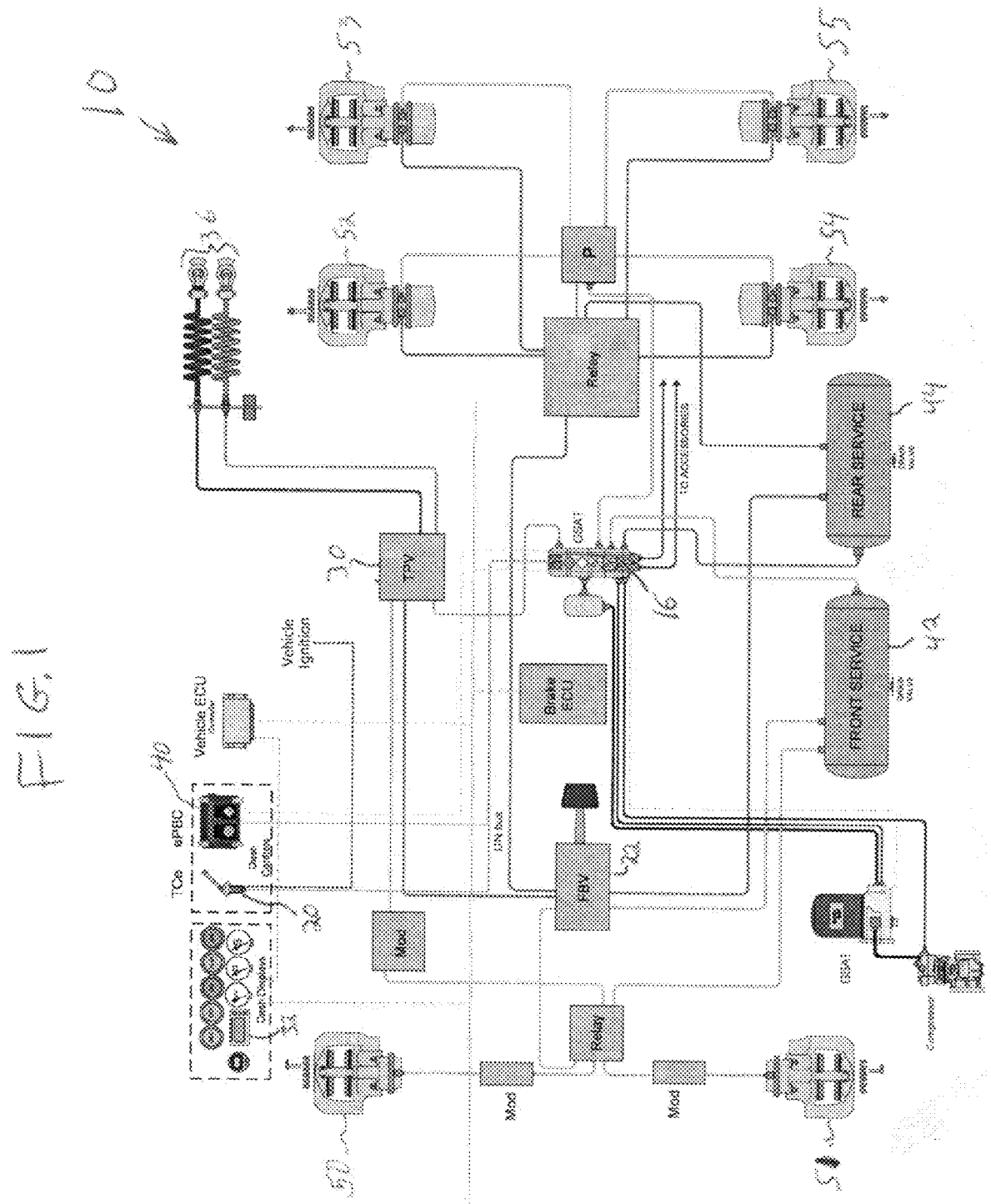
FIG. 1 illustrates a system diagram according to an embodiment of the present invention.

FIG. 1 illustrates a system diagram according to an embodiment of the present invention. The system of FIG. 1 is a stand-alone implementation of the electronic trailer hand control apparatus called a Trailer Control electronic (TCe) 20, in which signals from the TCe 20 are supplied directly to the valve controller called a Global Scalable Air Treatment (GSAT) 16 via a LIN bus, CAN bus, or the like. Upon receipt of the signals from the TCe 20, the GSAT 16 converts the received signal (e.g., voltage) into an amount of air pressure to be applied to the trailer service brakes. Based on the signals from the TCe 20 and additional signals described below, the GSAT 16 determines whether to apply the brakes and, if so, how much to apply them.

The tractor-trailer braking system 10 according to FIG. 1 includes a tractor portion and a trailer portion. FIG. 1 primarily illustrates the tractor portion of the system, but includes elements of the trailer portion and interfaces thereto, such as the TCe 20 and the glad hands 36. The tractor and trailer portions are pneumatically coupled to each other through the glad hands 36, and the tractor and trailer communicate electronically via power line carrier communications (PLC). As illustrated in FIG. 1, the system also includes various relays and modulators ("Mod"). The tractor-trailer braking system 10 includes reservoirs 42 and 44 that contain pressurized air for use in braking the tractor. Likewise, the trailer portion of the braking system includes one or more reservoirs that contain pressurized air for use in braking the trailer. For simplicity, this and other elements of the trailer portion of the braking system (e.g., brakes, pressure sensors, controllers, and the like) are not illustrated.

The tractor-trailer braking system 10 includes a foot brake valve (FBV) 22, which is a mechanical valve controlled by the driver foot brake and communicates pneumatically with the reservoirs 42 and 44. The driver depresses the FBV 22 when he intends to apply the service brakes of the tractor-trailer braking system 10. Air from the reservoirs 42 and 44 is delivered to various braking components (e.g., brakes 50-55) in order to slow down and stop the vehicle. Actuation of the FBV 22 will apply the service brakes on the tractor portion and the trailer portion of the tractor-trailer braking system 10.

The tractor-trailer braking system 10 includes pressure sensors (not illustrated), which may be coupled to the FBV 22 to measure the pressure delivered by the FBV 22 when the FBV 22 is actuated. The pressure sensors transmit signals indicative of a foot brake application.

As described above, the tractor-trailer braking system 10 includes the TCe 20. The driver manually actuates the TCe 20 when he intends to apply the service brakes of only the trailer portion of the braking system. The TCe 20 translates analog motion to a digital signal. The range of motion of the TCe 20 may be about ninety (90) degrees to allow for different gradations of braking to be requested. If only light braking is requested, the TCe 20 may be moved about ten (10) degrees. If full braking of the trailer service brakes is requested, the TCe 20 may be moved the full ninety (90) degrees. The trailer portion of the brake system may be applied via the TCe 20, for example, to hold the trailer when the trailer is being coupled to the tractor and to assist preventing the vehicle from rolling backwards when stopped on a hill. In general, operation of the trailer service brakes only via the TCe 20 should be limited to zero or low speed maneuvers.

The tractor-trailer braking system 10 also includes a tractor protection valve (TPV) 30 that receives pressure from the FBV 22 or a signal from the GSAT 16 and transmits the service brake control pressure to the trailer portion of the braking system. The TPV 30 is normally mounted at the rear of the cab. The TPV 30 is used to protect the tractor air brake system in the event of a trailer breakaway or severe air leak. The TPV 30 is also used shut off air to the trailer before disconnecting the air lines.

The tractor-trailer braking system 10 optionally includes a display device 32 to communicate the status of the tractor and trailer portions of the braking system to the driver as well as any warnings related thereto. The display device 32 may be a lamp, indicator, audible device or a display screen in the cab of the tractor. The display device 32 may also communicate vehicle information to a remote location via wireless communication, such that a fleet manager will receive information about the status of the tractor-trailer braking system 10. The GSAT 16 may include an output to control the display device 32 or may communicate with the display via a serial communications bus such as a LIN bus, a CAN bus or the like. Additionally, a haptic device may be coupled to the seat or steering wheel to provide the driver with haptic feedback when there is a problem with the tractor or trailer braking system.

The GSAT 16 includes at least one input (e.g., via CAN) to receive signals indicative of a foot brake application. The GSAT 16 also includes an input to receive an electronic signal from the TCe 20. The signal may represent the degree of actuation and duration of actuation desired for the trailer service brakes. The GSAT 16 includes an air cleaning portion with a purge valve and desiccant cartridge that cleans the air, and an air distribution portion, including relay valves, pressure protection valves, switches and an ECU, which takes the clean treated air and sends it to various circuits.

The GSAT 16 may also include an input to receive signals from a stop lamp device (e.g., via CAN). In another example, the GSAT 16 may also include an input for receiving signals indicative of automated brake applications, such as from a yaw rate sensor, accelerometer (YAS), and/or driver requested brake applications.

The GSAT 16 includes an output to supply the TPV 30. The GSAT 16 will supply or evacuate air in response to signals from the driver or the vehicle automated braking system.

The GSAT 16 includes a processor programmed to execute the functions of the GSAT described herein. The processor, which may include control logic, is programmed to receive signals from, e.g., the pressure sensors, the YAS, the stop lamp switch and the TCe 20 in order to control and monitor the trailer portion of the brake system. The processor may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the processor. The GSAT 16 may control the anti-lock braking and automated braking features, such as electronic stability control and advanced cruise control with braking, of the tractor portion of the braking system.

The processor may further include a timer, which may be used for timing the length of the application of the TCe 20. The processor is capable of determining and recording trailer brake applications by comparing the requests for braking of the trailer with the actual braking of the tractor. The processor will also compare the requested braking of the trailer to predetermined time periods.

In the standalone system illustrated in FIG. 1, the GSAT 16 receives signals via CAN or LIN interface from the TCe 20, processing messages from the standalone system, and thus it is less affected by outside interference, such as electromagnetic noise. Also, the GSAT 16 and the TCe 20 operate independently from the ePBC 40 in the standalone system. Thus, if the ePBC 40 is not operating correctly, the TCe 20 would still have the functionality to control the trailer brakes. Accordingly, the standalone system provides a lower system cost since an ePBC is not required, improved communication, and faster system response.

Figure 2:
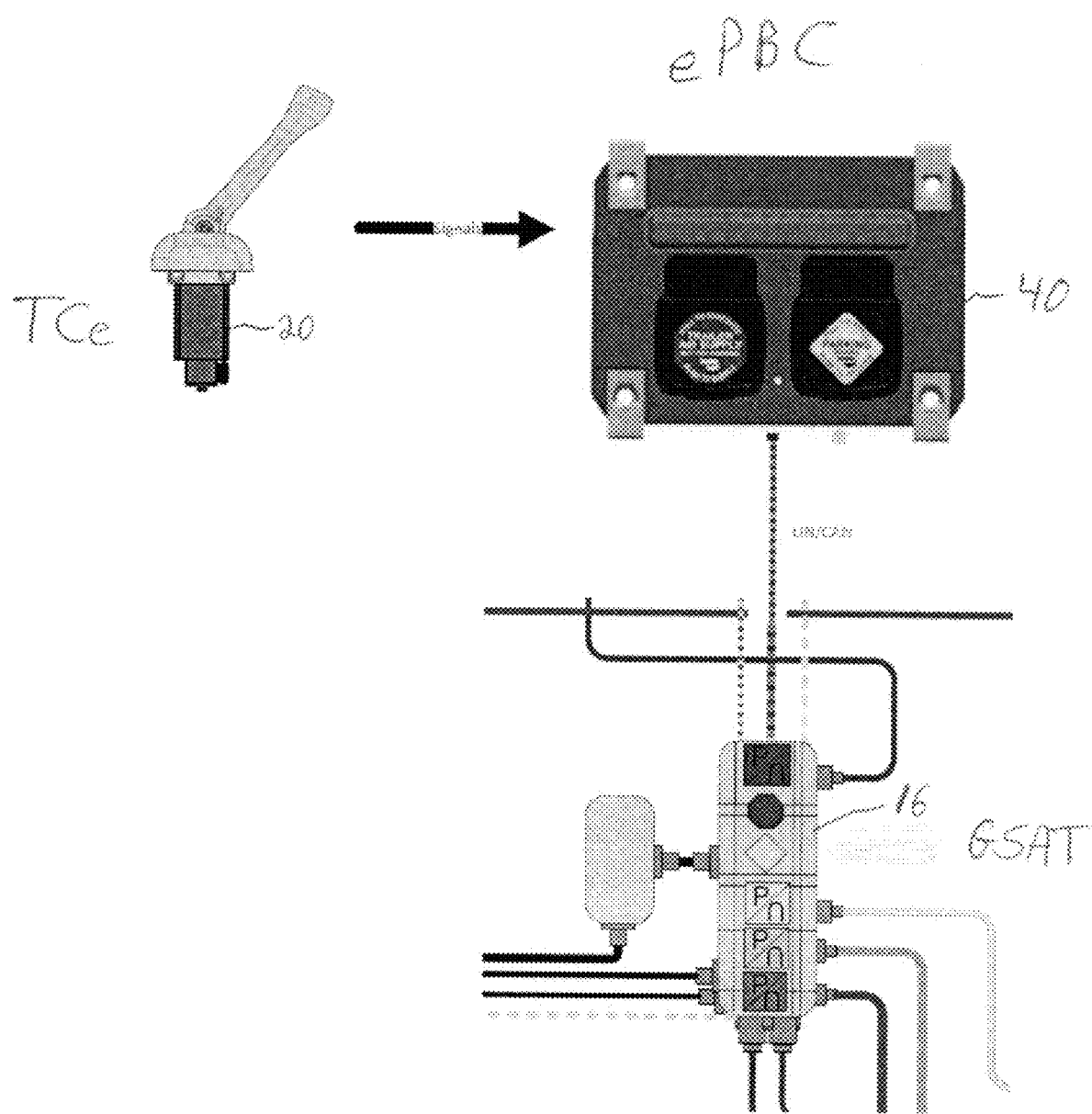
FIG. 2 illustrates a partial system diagram according to a modified version of the embodiment of the present invention in FIG. 1.

FIG. 2 illustrates a partial system diagram according to a modified version of the embodiment of the present invention illustrated in FIG. 1. The arrangement in FIG. 2 is called a hosted implementation, in which a host electronic control unit (ECU) reads the differential signals from the TCe, interprets them, and sends the information on the serial communication bus to an ECU that has control of the air pressure system of the trailer.

The electronic signals from the TCe 20 are supplied to an electronic park brake controller (ePBC) 40 that processes the signals and subsequently provides its outputs indicating driver intent via a LIN bus, CAN bus or the like to the GSAT 16 for processing. The GSAT 16 controls the delivery and exhaust of the tractor and trailer air based, in part on the outputs received from the ePBC 40. The GSAT 16 is used to park the tractor, the trailer, or both. Other portions of the system of FIG. 2 correspond to those of FIG. 1 described above, and thus are not illustrated in FIG. 2 or described again here. In the hosted system, a controller needs to be present in the ePBC 40 to interpret the signals coming from the TCe 20, which saves cost on the TCe 20 side.

The systems according to the present invention provide low-cost solutions to detect the position of the trailer brake controller. According to one embodiment of the invention, two potentiometers 70 and 71 that change in opposite resistance values—one goes up in value while one goes down in value—are used to detect and ensure a change in position of the TCe 20 is correct since the two signals from the potentiometers are set up as a differential. See FIG. 3. For example, one potentiometer can vary between 0 VDC and 5 VDC, which the other potentiometer varies from 5 VDC to 0 VDC over the range of movement of the TCe 20. Alternatively, a low frequency signal (e.g., 5 kHz) and a high frequency signal (e.g., 10 kHz or 15 kHz), or signals having different duty cycles (e.g., 20% or 100%) can be used instead of the voltage to provide the differential signal for controlling the trailer service braking.

Figure 3:
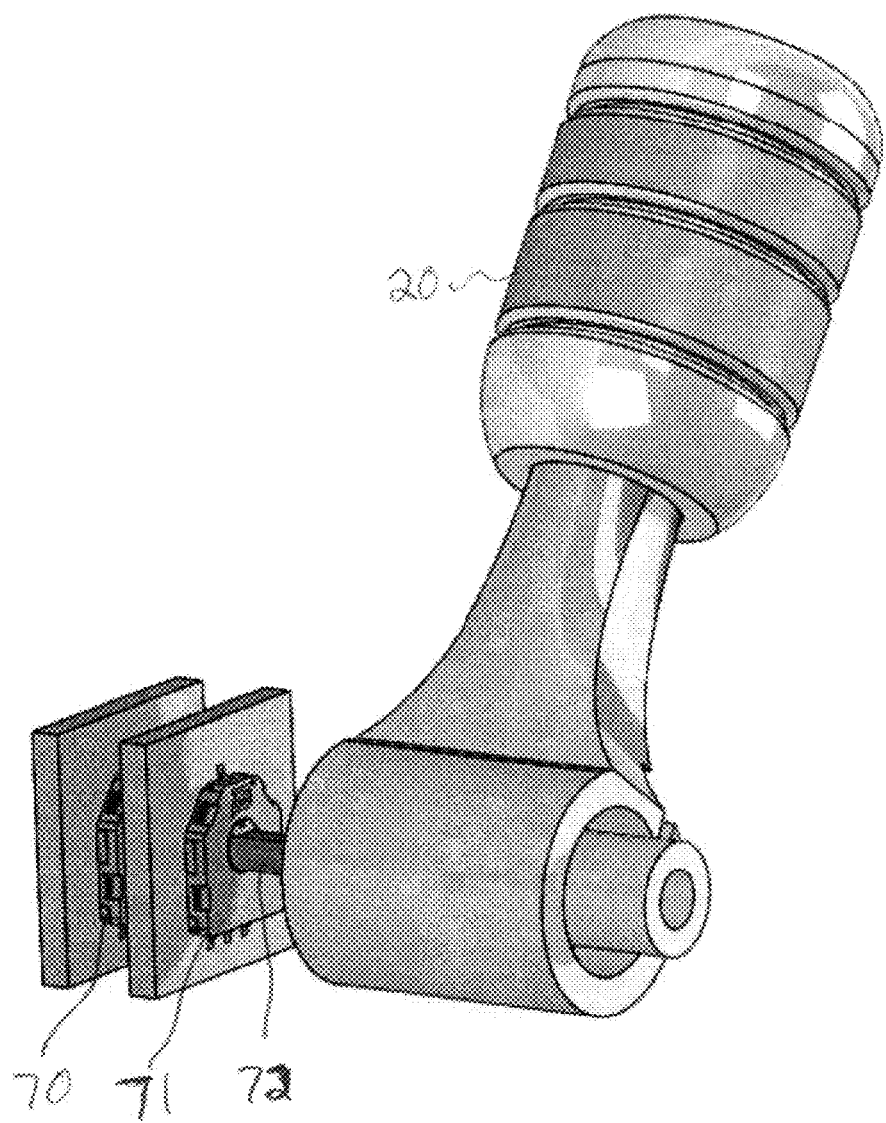
FIG. 3 illustrates an exemplary embodiment of an electronic trailer hand control apparatus according to the present invention.

As illustrated in FIG. 3, the TCe 20 may include the two potentiometers 70 and 71 arranged to operate in a differential configuration. The potentiometers 70 and 71 are attached to a shaft 72 that rotates when the handle of the TCe is moved, such that their resistances and voltages vary in a differential manner over the range of movement of the TCe 20.

If additional safety is required, there can be an offset in the resistance value for one of the potentiometers. If both potentiometers are the same resistance value and have the number of turns to execute a full sweep of resistance, there will be a point in the handle position where both potentiometers read the same value. In order to correct this, one of the potentiometers can have a different resistor paired with it creating a different voltage division ratio. The microcontroller measuring the voltage will be aware of the offset and remove this value in software, thereby ensuring that both hardware signals, although different, are still related.

Diagnostics will be able to determine if the handle is shorted. When ADC=0V, the potentiometers are not connected; when ADC=VCC, and with a plausibility check, both potentiometers are operating correctly. As potentiometers are metal on metal sweeps to change resistance, it is possible a "dead zone" might occur if the TCe 20 is held at a constant position for elongated periods of time. If, during a TCe movement, the voltage read by the ADC is erroneous only in certain positions, it will log these and trigger a maintenance warning for a new TCe.

In an alternative embodiment, the potentiometers are replaced by a Hall effect sensing device with two magnets placed on the TCe 20 and two sensors placed on the opposing PCB which will track the position of the TCe 20. The detected magnetic signals are used to determine the amount of movement of the TCe 20 in a manner corresponding to that for the two potentiometers. Alternatively, the sensing of the movement of the TCe may be performed using inductive sensing or other sensing methods.

Figure 4:
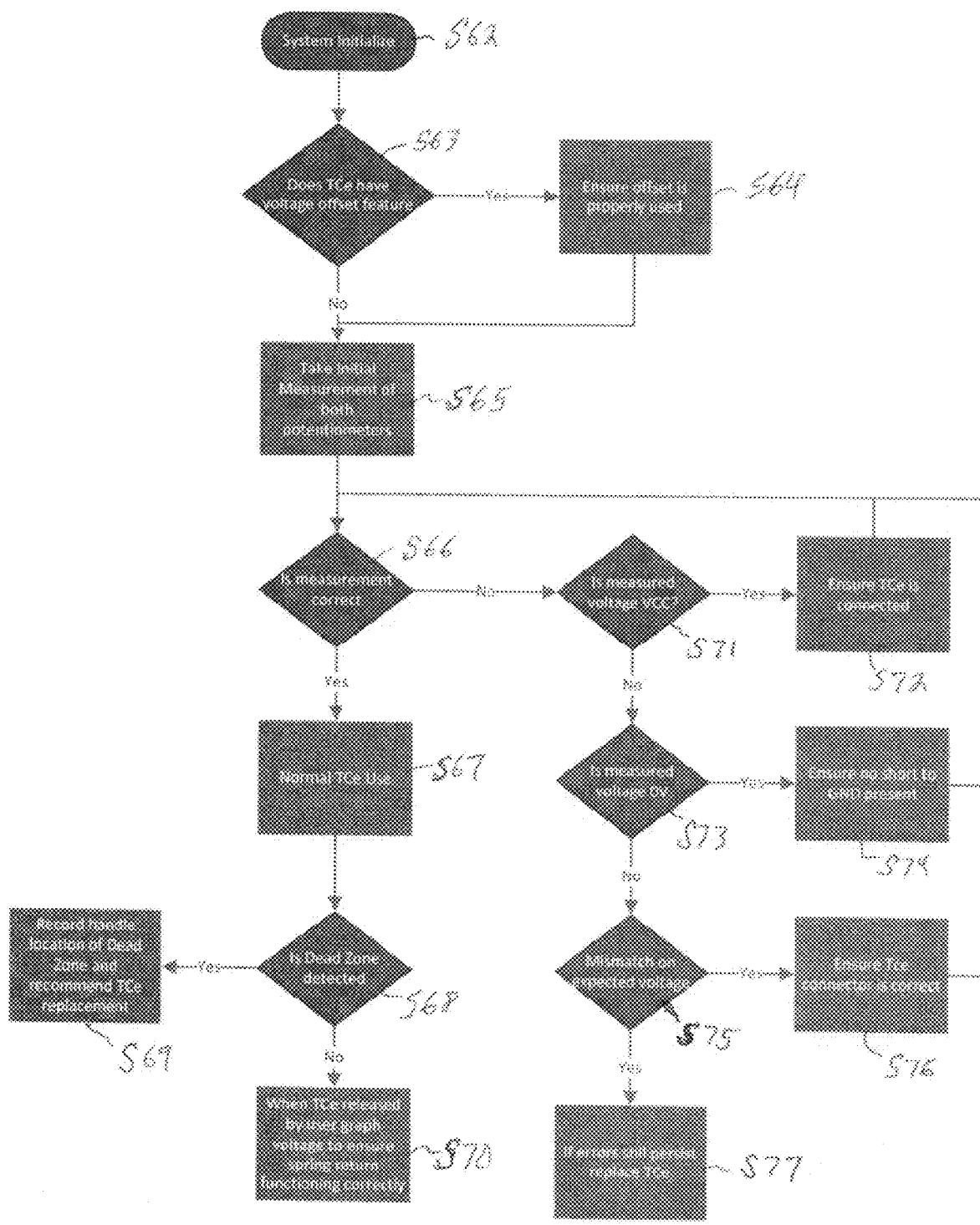
FIG. 4 illustrates a method according to an embodiment of the present invention.

FIG. 4 illustrates a method according to the present invention for ensuring proper functioning of the TCe 20. The method begins in step S62 with a system initialization.

In step S63, a determination is made of whether the TCe 20 includes a voltage offset feature. If so, step S64 ensures that the offset is used properly as described above. In step S65, an initial measurement of both potentiometers 70 and 71 is taken.

In step S66, it is determined whether the measurements are correct. If the measurements are correct, then in step S67 normal operation of the TCe is implemented. During normal operation, a determination is made of whether a "dead zone" is detected in step S68. If a "dead zone" is detected, the handle location of the "dead zone" is recorded and replacement of the TCe 20 is recommended in step S69. On the other hand, if no "dead zone" is detected, then in step S70 the voltage signal is graphed to ensure that the spring return of the TCe is functioning correctly.

If in step S66 it is determined that the measurements of the potentiometers are not correct, then a determination is made of whether the measured voltage is VCC. If the voltage is VCC, then the user is instructed to ensure that the TCe is connected. If the voltage is not VCC, the it is determined in step S73 whether the voltage is 0V. If so, then the user is instructed in step S74 to ensure that no short to ground is present.

In the case that the measured voltage is determined not to be 0V in step S73, then in step S75 it is determined whether there is a mismatch on the expected voltage. If there is a mismatch, then in step S76 the user is instructed to ensure that the TCe is connected properly. Also, if there is a mismatch on the expected voltage, then in step S77 the user is advised to replace the TCe.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A controller programmed to control trailer braking on a tractor-trailer vehicle, the controller comprising:
    an electronic processor having an input for receiving a signal indicating a position of a trailer hand control apparatus; and
    a memory electrically coupled to the electronic processor and having instructions stored therein, which cause the electronic processor to:
    receive the signal from the trailer hand control apparatus;
    compare the signal to a predetermined signal profile; and
    output a control signal to control application of trailer service brakes based on the signal and the predetermined signal profile;
    wherein the signal comprises a first frequency component and a second frequency component, and an amount of movement of the trailer hand control apparatus is indicated by a difference between the first frequency component and the second frequency component.

2. The controller according to claim 1, wherein the instructions stored in the memory further cause the electronic processor to determine if the trailer hand control apparatus has a voltage offset, and in a case in which the trailer hand control apparatus has the voltage offset, the electronic processor removes the voltage offset prior to the comparison.

3. The controller according to claim 1, wherein the signal comprises a variable duty cycle, and an amount of movement of the trailer hand control apparatus is indicated by the duty cycle.

4. The controller according to claim 1, wherein the signal comprises a differential signal obtained from two magnetic sensors having magnetic fields that change in opposite directions based on movement of the trailer hand control apparatus.

5. A controller programmed to control trailer braking on a tractor-trailer vehicle, the controller comprising:
    an electronic processor having an input for receiving a signal indicating a position of a trailer hand control apparatus; and
    a memory electrically coupled to the electronic processor and having instructions stored therein, which cause the electronic processor to:
    receive the signal from the trailer hand control apparatus;
    compare the signal to a predetermined signal profile; and
    output a control signal to control application of the trailer service brakes based on the signal and the predetermined signal profile;
    wherein the signal comprises a differential signal obtained from two potentiometers having resistances that change in opposite directions based on movement of the trailer hand control apparatus; and
    wherein the two potentiometers have different voltage division ratios based on resistors of different values being disposed in the two potentiometers.

6. A method for controlling trailer braking on a tractor-trailer vehicle, the method comprising:
    receiving a signal indicating a position of a trailer hand control apparatus;
    comparing the signal to a predetermined signal profile; and
    outputting a control signal to control application of trailer service brakes based on the signal and the predetermined signal profile;
    wherein the signal comprises a first frequency component and a second frequency component, and an amount of movement of the trailer hand control apparatus is indicated by a difference between the first frequency component and the second frequency component.

7. The method according to claim 6, further comprising:
    determining if the trailer hand control apparatus has a voltage offset, and in a case in which the trailer hand control apparatus has the voltage offset, removing the voltage offset prior to the comparison.

8. The method according to claim 6, wherein the signal comprises a variable duty cycle, and an amount of movement of the trailer hand control apparatus is indicated by the duty cycle.

9. The method according to claim 6, wherein the signal comprises a differential signal obtained from two magnetic sensors having magnetic fields that change in opposite directions based on movement of the trailer hand control apparatus.

10. A method for controlling trailer braking on a tractor-trailer vehicle, the method comprising:
    receiving a signal indicating a position of a trailer hand control apparatus;
    comparing the signal to a predetermined signal profile; and outputting a control signal to control application of trailer service brakes based on the signal and the predetermined signal profile;

wherein the signal comprises a differential signal obtained from two potentiometers having resistances that change in opposite directions based on movement of the trailer hand control apparatus; and wherein the two potentiometers have different voltage division ratios based on resistors of different values being disposed in the two potentiometers.

11. A system for controlling trailer braking on a tractor-trailer vehicle, the system comprising:

an electronic trailer hand control apparatus;

an electronic processor having an input for receiving a signal indicating a position of the trailer hand control apparatus; and a memory electrically coupled to the electronic processor and having instructions stored therein, which cause the electronic processor to:

receive the signal from the trailer hand control apparatus;

compare the signal to a predetermined signal profile; and output a control signal to control application of trailer service brakes based on the signal and the predetermined signal profile;

wherein the signal comprises a first frequency component and a second frequency component, and an amount of movement of the trailer hand control apparatus is indicated by a difference between the first frequency component and the second frequency component.

12. The system according to claim 11, wherein the control signal is output to a valve controller which controls the application of the trailer service brakes.

13. The system according to claim 11, wherein the instructions stored in the memory further cause the electronic processor to determine if the trailer hand control apparatus has a voltage offset, and in a case in which the trailer hand control apparatus has the voltage offset the electronic processor removes the voltage offset prior to the comparison.

14. The system according to claim 11, wherein the signal comprises a variable duty cycle, and an amount of movement of the trailer hand control apparatus is indicated by the duty cycle.

15. The system according to claim 11, wherein the signal comprises a differential signal obtained from two magnetic sensors having magnetic fields that change in opposite directions based on movement of the trailer hand control apparatus.

16. A system for controlling trailer braking on a tractor-trailer vehicle, the system comprising:

an electronic trailer hand control apparatus;

an electronic processor having an input for receiving a signal indicating a position of a trailer hand control apparatus; and a memory electrically coupled to the electronic processor and having instructions stored therein, which cause the electronic processor to:

receive the signal from the trailer hand control apparatus;

compare the signal to a predetermined signal profile; and output a control signal to control application of trailer service brakes based on the signal and the predetermined signal profile;

wherein the signal comprises a differential signal obtained from two potentiometers having resistances that change in opposite directions based on movement of the trailer hand control apparatus; and wherein the two potentiometers have different voltage division ratios based on resistors of different values being disposed in the two potentiometers.

\* \* \* \* \*